United States Patent [19]
Parmelee

[11] 3,945,132
[45] Mar. 23, 1976

[54] DISPLAY SYSTEM

[76] Inventor: David M. Parmelee, Vantage Point, Spring Lake, Mich. 49456

[22] Filed: Sept. 27, 1974

[21] Appl. No.: 510,060

[52] U.S. Cl. .......................... 35/60; 35/53; 52/36; 272/10; 352/89
[51] Int. Cl.² ...................................... G09B 25/00
[58] Field of Search ......... 35/12 N, 53, 16, 60, 19, 35/55; 52/6, 27, 36; 272/10; 352/70, 89; 353/30; 354/291

[56] References Cited
UNITED STATES PATENTS

| | | | |
|---|---|---|---|
| 337,904 | 3/1886 | Wetherby | 354/291 |
| 1,150,869 | 8/1915 | Lewin | 272/10 |
| 1,806,452 | 5/1931 | Fulgora | 352/40 |
| 1,821,626 | 9/1931 | Fleischer | 352/88 |
| 2,196,587 | 4/1940 | Herrold | 35/53 |
| 2,301,274 | 11/1942 | Greiser | 35/53 |
| 2,488,955 | 11/1949 | Wood | 353/35 |
| 2,591,428 | 1/1950 | Harris | 353/29 |
| 2,668,472 | 2/1954 | Lierley | 352/89 |
| 3,192,827 | 7/1965 | Nagy | 353/30 |
| 3,269,034 | 8/1966 | Glass | 35/53 |
| 3,373,654 | 3/1968 | Carolan | 353/78 |
| 3,418,765 | 12/1968 | Propst | 52/36 |
| 3,514,871 | 6/1970 | Tucker | 35/12 N |
| 3,531,898 | 10/1970 | Facemire | 272/10 X |
| 3,603,004 | 11/1968 | Fink | 35/16 |
| 3,683,779 | 8/1972 | Lifton | 354/292 |
| 3,698,104 | 10/1972 | Sutton | 35/60 |

FOREIGN PATENTS OR APPLICATIONS

| | | |
|---|---|---|
| 347,184 | 12/1904 | France |
| 61,859 | 10/1913 | Austria |
| 66,951 | 3/1892 | Germany |

*Primary Examiner*—Harland S. Skogquist
*Attorney, Agent, or Firm*—Price, Heneveld, Huizenga & Cooper

[57] ABSTRACT

A combination physical and projected display system for merchandising furniture and the like, includes an article support platform at least partly surrounded by panels serving as projecting screens. Furniture articles or the like positioned on this platform are complemented by selected background images rear-projected onto the screens by projectors positioned behind the panels.

3 Claims, 6 Drawing Figures

DISPLAY SYSTEM

BACKGROUND OF THE INVENTION

The present invention relates to display devices and particularly to a system for displaying real products in combination with rear-projected image backgrounds.

The display of products in many industries is difficult on a large scale due to the physical size of the products being displayed. Thus, for example, in the furniture business, tremendously large floor space is required to display entire rooms of furniture. For many stores, particularly smaller stores, and/or stores handling a variety of goods, this is practically impossible due to their limited space. In such situations, only selected individual pieces of furniture can be shown, or else a very limited number of "rooms" of furniture. Because of this limitation, and the need for most potential customers to see groupings of furniture items being considered, smaller stores are experiencing serious difficulties.

Additionally, it is frequently desirable to display furniture and other products in the environment in which they would be used. Accordingly, in large furniture stores with sufficient space, separating panels have been employed which include draperies, windows and the like to simulate room environments. While such displays provide the desired effect, they are relatively fixed in nature, so that the drapery colors, shapes and so forth cannot easily be changed. And, such displays are expensive as well as inflexible.

SUMMARY OF THE INVENTION

The present invention solves these and other shortcomings by providing a display module including a platform on which displayed articles are positioned surrounded at least in part by rear-projected, complementary images on one or more translucent projecting screens. The projectors which cast these background images onto the screens are positioned behind the screens and out of sight.

The display module of the present invention permits the unique visual portrayal of a combination of products with image backgrounds which can be widely varied. The images can be on slides or can be moving backgrounds. The display modules can include single, double, triple or any number of display units for displaying one or more settings of articles. Small stores can incorporate the invention to effectively compete with large stores, because of the reasonable cost, minimal floor space required, and flexibility provided.

DETAILED DESCRIPTION OF THE PREFERRED EMBODIMENT

Figure 1:
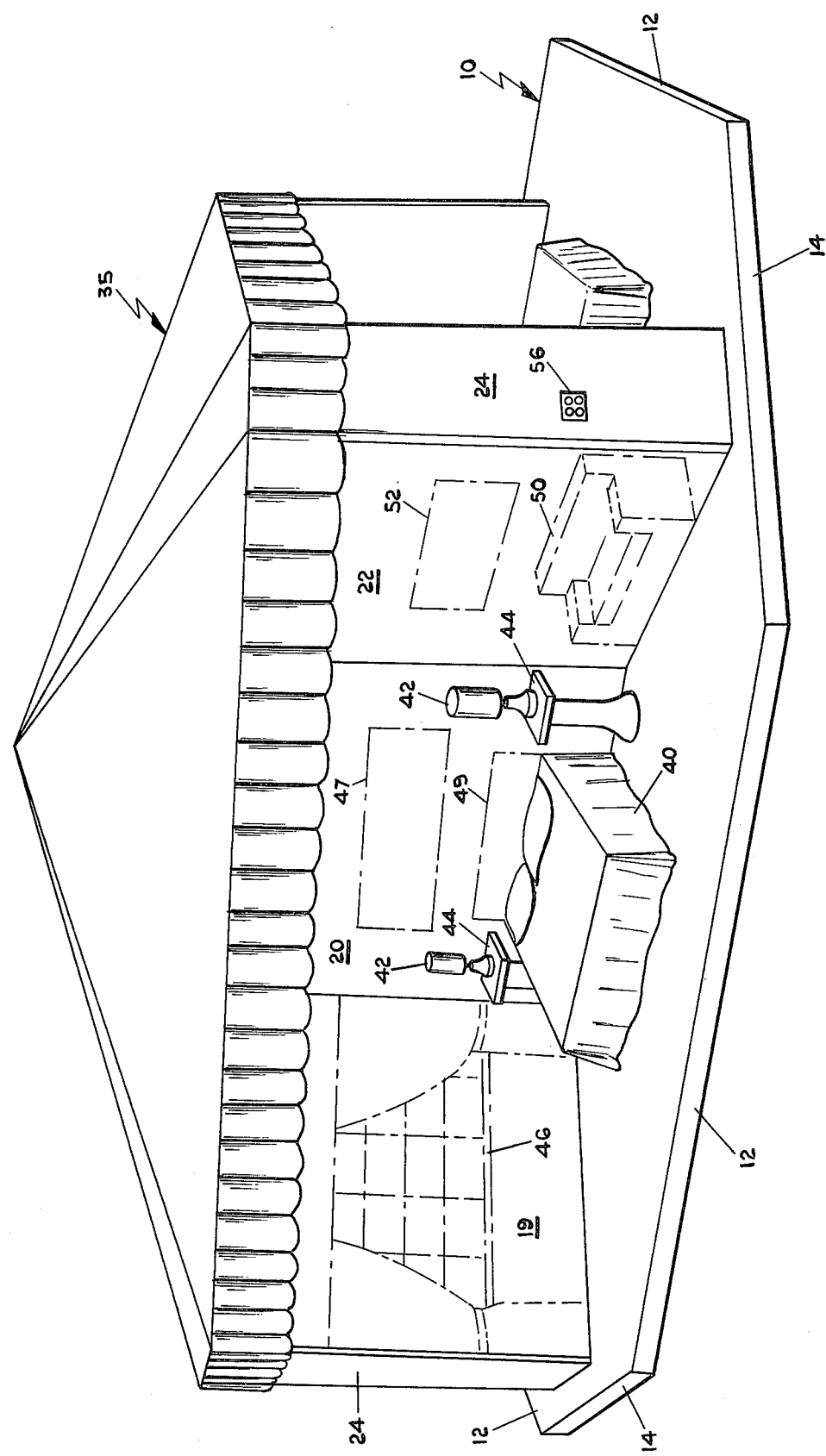
FIG. 1 is a perspective view of a four-unit display module embodying the present invention.
Figure 2:
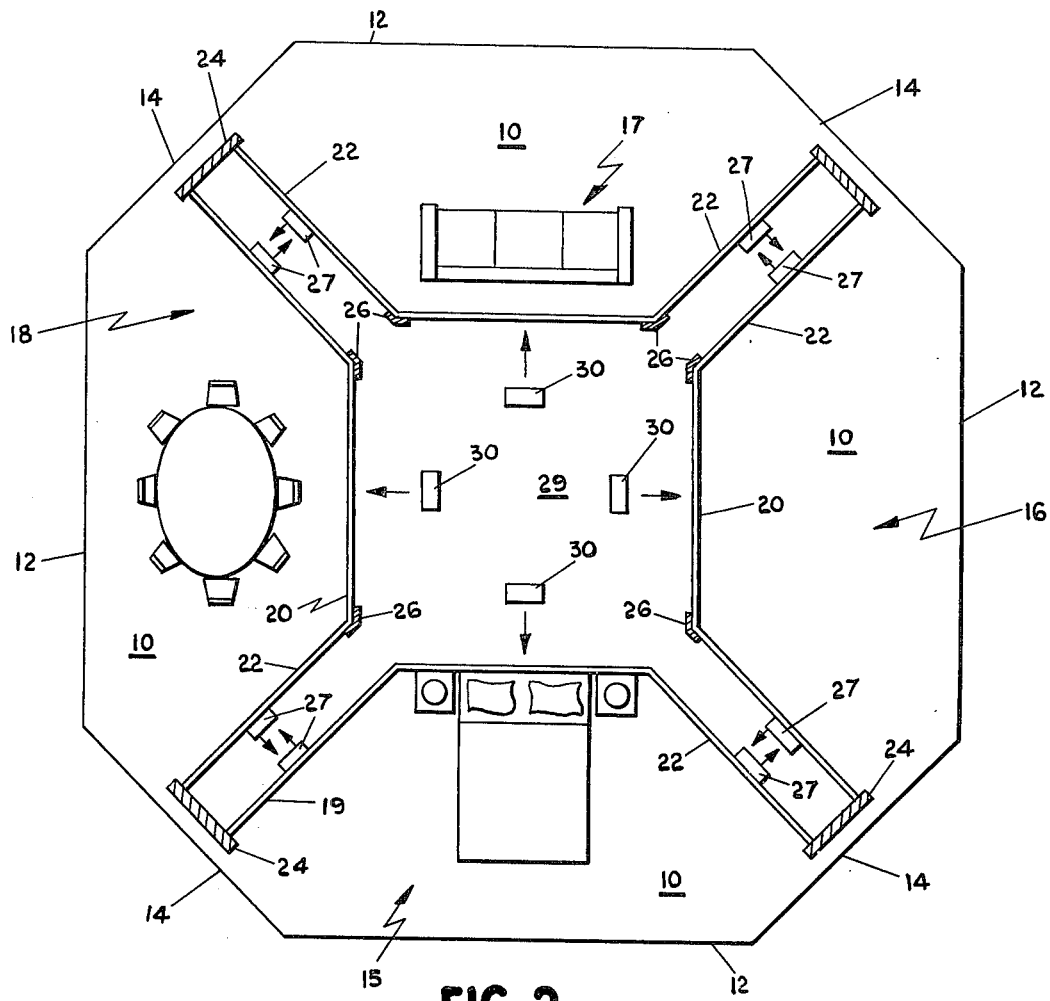
FIG. 2 is a plan view of the display module shown in FIG. 1 shown with the canopy removed.

Referring now to FIGS. 1 and 2, there is shown a four-unit display module comprising a platform 10 having, as best seen in FIG. 2, eight edges whereby alternate edges 12 comprise the front edges and are significantly wider than interconnecting edges 14. Platform 10 defines the floor for supporting displayed products and can be stationary or if desired, can be mounted on a suitable turntable in a conventional manner so as to rotate the platform and the displays thereon. The platform as shown is divided into four display units 15, 16, 17 and 18 as best seen in FIG. 2.

This partitioning of the display module into units is by commercially available translucent projector screens which in the preferred embodiment comprise a left side screen 19, a center (or rear) screen 20 and a right side screen 22 for each of the display units. The screens may be of any suitable rear projection type, e.g., fabric stretched within a frame, or a single or composite sheet of plastic or glass. Initially, transparent material with a roughened or beaded surface to render it translucent can also be used. The screens of each unit are supported at an angle of approximately 135° relative to the adjacent screen, the other ends of the side screens being supported by solid end panels 24 and the three screens at their junctions by corner posts or connectors 26. At least one of the end panels 24 defines a doorway for access to the central area of the platform 10.

Adjacent side screens 19 and 22 are spaced to define an access aisle 25 therebetween in which opposite facing projectors 27 are positioned to project an image onto the back of the respective screens in a direction indicated by the arrows associated with the projectors. In the square central area 29 of the platform, additional projectors 30 are positioned to project images onto the back of rear screens 20 of each display unit. The projectors are suitably elevated from floor 10 and each has a wide angle projecting lens to assure full coverage of the screen even when positioned relatively close to the screen. The projectors can be conventional slide projectors or in some cases where a running background is desired (as for example, with auto or boat displays), movie projectors. These projectors are not seen from the normal viewing area of the display units, but are readily accessible to store personnel.

The display module may be covered as by a canopy assembly 35 which serves to darken the screens 19, 20 and 22 of each of the display units as well as provide a support roof for receiving spotlights which can be employed to highlight the objects positioned on the display floor without affecting the imaged background.

In the embodiment shown in FIGS. 1 and 2, as one example, display unit 15 includes a bed 40 and a pair of lamps 42 on side tables 44. To complement these articles of furniture, the projector 27 associated with screen 19 projects a draped window image 46 shown in phantom lines in FIG. 1 while the rear projector 30 associated with screen 20 projects a painting 47 and selected headboard 49 associated with bed 40. Finally, the projector 27 associated with the right side screen 22 projects another article of furniture such as a loveseat 50 and wall decoration 52. Thus, it is seen that the actual or real furniture displayed is complemented by images projected on the opaque panels which can be complementary furniture of the same general style and furniture line, draperies, wall decorations and/or other suitable background to give the visual effect or illusion of an entire room of a house. Additionally, each of the projectors can comprise an automatically sequenced projector for selectively changing the decor of the display. The projected background can also be changed either by a salesman or a customer at a suitable control panel 56 positioned, for example, in the end wall adjacent the display unit.

The display module of the present invention can be adapted for single, double, triple, quadruple or other multiple use as shown in FIGS. 3 through 6. In each of these embodiments the construction of each display unit is identical to that shown in FIG. 1, with the platform being a sector of the eight-sided platform shown in FIG. 1 or, as in the case of FIG. 6, a pair of complete modules positioned adjacent each other.

Figure 3:
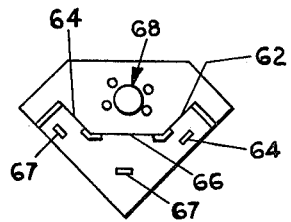
FIG. 3 is a plan schematic view of a single-unit display module.
Figure 4:
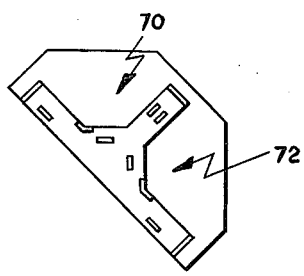
FIG. 4 is a plan schematic view of a double-unit display module.
Figure 5:
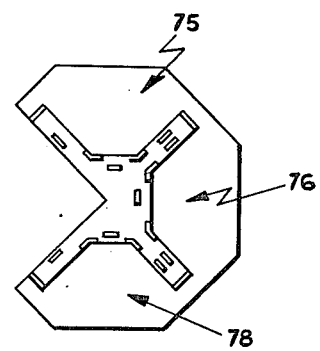
FIG. 5 is a plan schematic view of a triple-unit display module.

In FIG. 3, the module comprises a single display unit particularly adapted for positioning in a corner. The unit includes side projection screens 62, 64 and a rear screen 66. Projectors 67 are associated with each screen to project a background to the displayed table and chair set 68. Similarly, a pair of display units 70 and 72 are provided in the FIG. 4 construction while three display units 75, 76 and 78 are employed in the FIG. 5 system.

Figure 6:
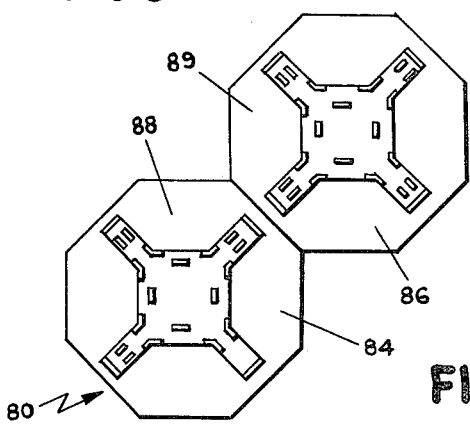
FIG. 6 is a plan schematic view of a multiplemodule display system.

In the embodiment shown in FIG. 6, a pair of modules 80 and 82 identical to the one shown in FIGS. 1 and 2, are adjoined to provide eight display areas, each of which can be unique. Alternatively, the adjacent display areas 84 and 86, and 88 and 89, respectively, can be combined to provide two larger central areas on opposite sides of the pairs of modules. It can be seen by such construction that any number of the four display unit modules can be joined to provide a relatively large display complex if desired.

It will become apparent to those skilled in the art that various modifications to the present invention can be made. Such modifications may, for example, include the provision of greater or fewer number of projection screens surrounding a portion of the display and positioned at different angles with respect to adjacent screens. Additionally, the display module may include a greater or lesser number of display units than the four units shown in the preferred embodiment. These and other modifications of the illustrative embodiment of the present invention set forth, and falling within the spirit of the invention, are intended to be encompassed within the invention as defined by the appended claims.

The embodiments of the invention in in which an exclusive property or privilege is claim are defined as follows:

1. A display module including a plurality of adjacent angularly related display units, each display unit including a supporting floor for receiving an article to be displayed, said supporting floor for said display units comprising a platform, a back projection screen positioned on the floor adjacent the rear of said floor, and a pair of side projection screens positioned adjacent opposite ends of said back screen and extending outwardly at an angle to said back screen to define the sides of the display unit, said side screens supported in spaced relationship to adjacent side screens of an adjacent display unit and coupled thereto for support, said side screens of adjacent display units being generally parallel to one another, said platform comprises an eight-sided platform with alternate sides of equal width and wider than the remaining sides, wherein said alternate sides define the front of each display unit and wherein said back screens extend parallel to said alternate edges and said side screens extend orthogonally to said remaining sides.

2. The display module as defined in claim 1 and further including a canopy extending over said screens.

3. The display module as defined in claim 2 and further including means for projecting images on each of said screens.

* * * * *